Dec. 16, 1941.   P. O. CHAMBERS   2,266,720
TIRE REPAIR VULCANIZER
Filed April 27, 1939   4 Sheets-Sheet 1
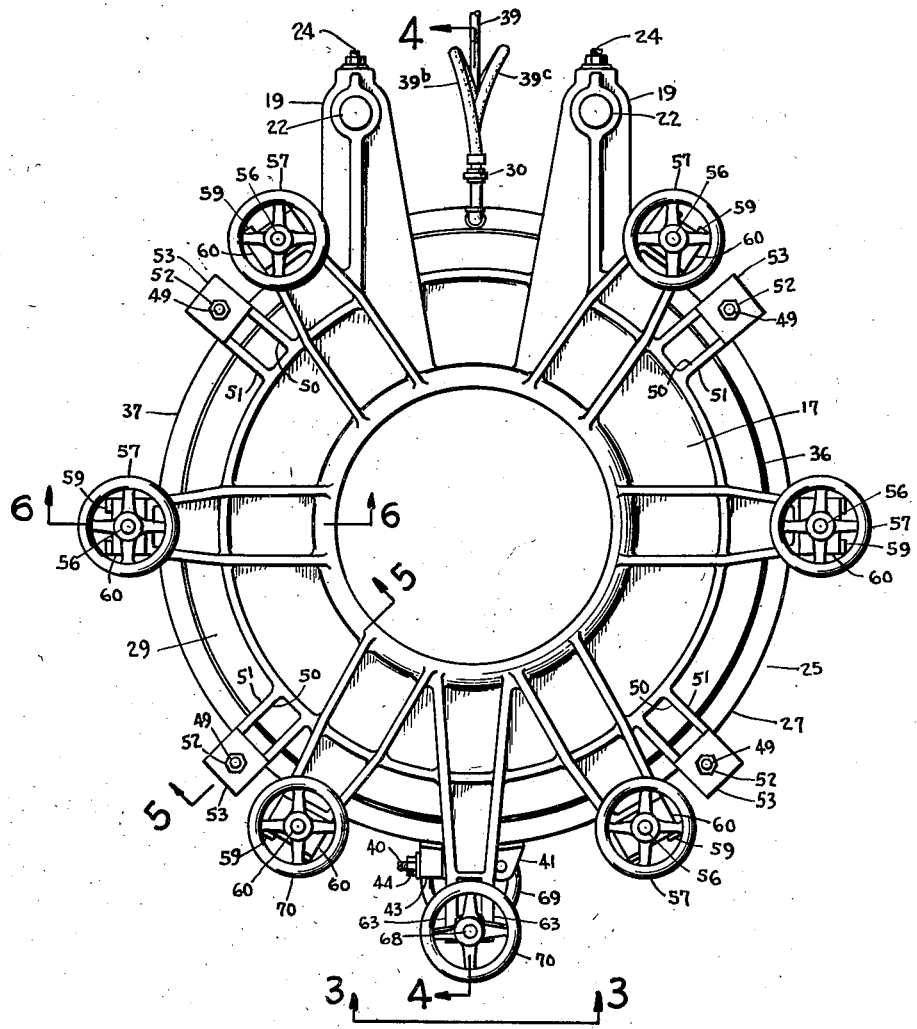
INVENTOR
PERRY O. CHAMBERS
BY
Ralph Barrow
ATTORNEY Dec. 16, 1941.  P. O. CHAMBERS  2,266,720
TIRE REPAIR VULCANIZER
Filed April 27, 1939   4 Sheets-Sheet 2
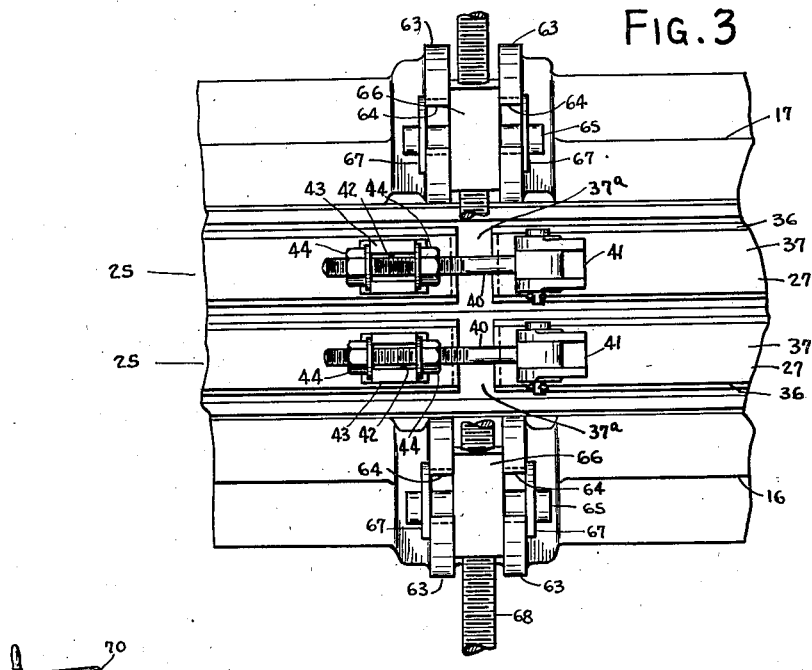
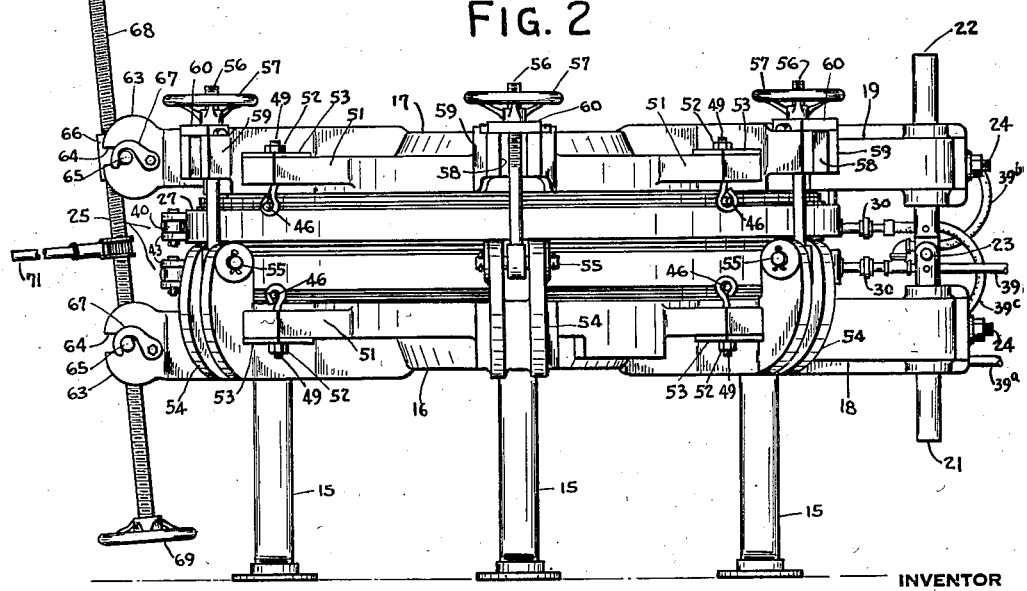
INVENTOR
PERRY O. CHAMBERS
BY
J. Ralph Barrow
ATTORNEY Dec. 16, 1941.   P. O. CHAMBERS   2,266,720
TIRE REPAIR VULCANIZER
Filed April 27, 1939   4 Sheets-Sheet 3

INVENTOR
PERRY O. CHAMBERS
BY
Ralph Barrow
ATTORNEY

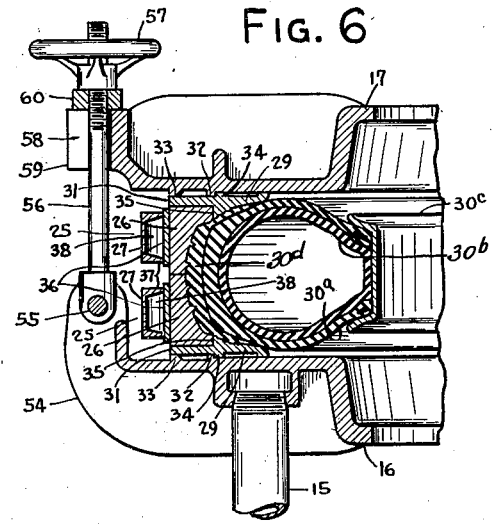
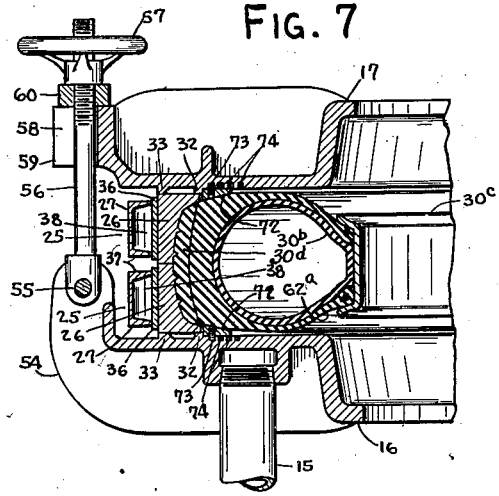
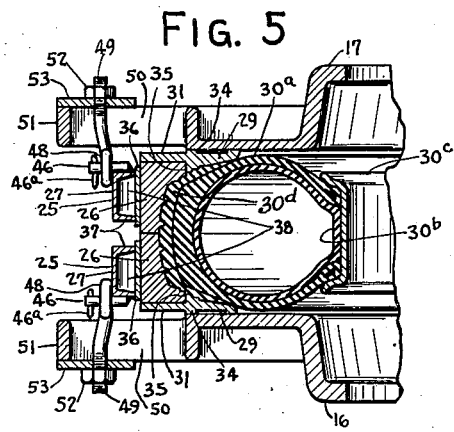
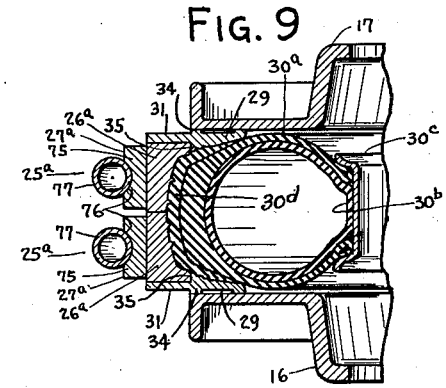
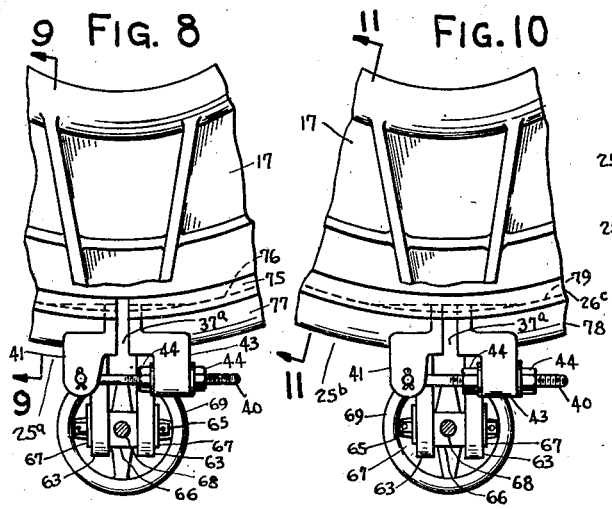
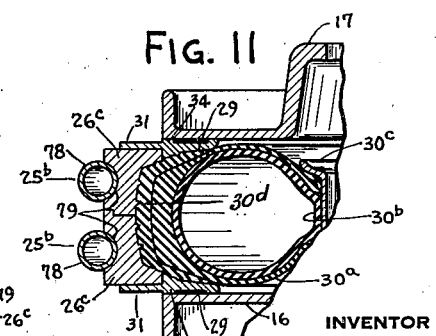

Patented Dec. 16, 1941

2,266,720

UNITED STATES PATENT OFFICE 2,266,720

TIRE REPAIR VULCANIZER

Perry O. Chambers, Chicago, Ill., assignor to Safety Vulcanizer Company, Chicago, Ill., a corporation of Illinois Application April 27, 1939, Serial No. 270,333

9 Claims. (Cl. 18—18)

This invention relates to vulcanizers and in particular relates to vulcanizers for use in retreading or recapping pneumatic tires.

Heretofore, full-circle retreading or recapping vulcanizers have been limited to use for repairing tires within a relatively narrow range of sizes. For this reason tire repairmen either have been required to maintain different sized vulcanizers to accommodate the various tire sizes or they have been materially limited in the range of tire sizes they were able to repair.

A general object of this invention is to provide a simple, inexpensive retreading or recapping vulcanizer capable of being easily and quickly modified to accommodate a wide range of tire sizes.

A particular object of the invention is to provide a full-circle retreading or recapping vulcanizer having separate tire-vulcanizing units removably and replaceably mounted on and supported by each vulcanizer platen, these units comprising removable and replaceable matrices and matrix heating parts, whereby the vulcanizer may be easily and rapidly be adapted to accommodate a wide range of tire sizes.

The foregoing and other objects of the invention will be manifest from the following brief description and accompanying drawings.

Of the accompanying drawings:

Figure 1 is a plan view of a full-circle retread vulcanizer embodying the invention.

Figure 2 is a side elevation of Figure 1, as viewed from the right thereof.

Figure 3 is an enlarged fragmentary front view of a portion of the apparatus, taken substantially at line 3—3 of Figure 1.

Figure 5 is a fragmentary cross-section taken substantially on line 5—5 of Figure 1.

Figure 6 is a fragmentary section taken substantially on line 6—6 of Figure 1.

Figure 7 is a view similar to Figure 6, illustrating the adaptation of the vulcanizer for tire recapping.

Figure 8 is a fragmentary plan view illustrating a modified form of split heating ring as applied to the vulcanizer shown in Figures 1 to 6.

Figure 9 is a cross-section taken on line 9—9 of Figure 8.

Figure 10 is a view similar to Figure 8 illustrating another modified form of split heating ring.

Figure 11 is a cross-section taken on line 11—11 of Figure 10.

Figure 4:
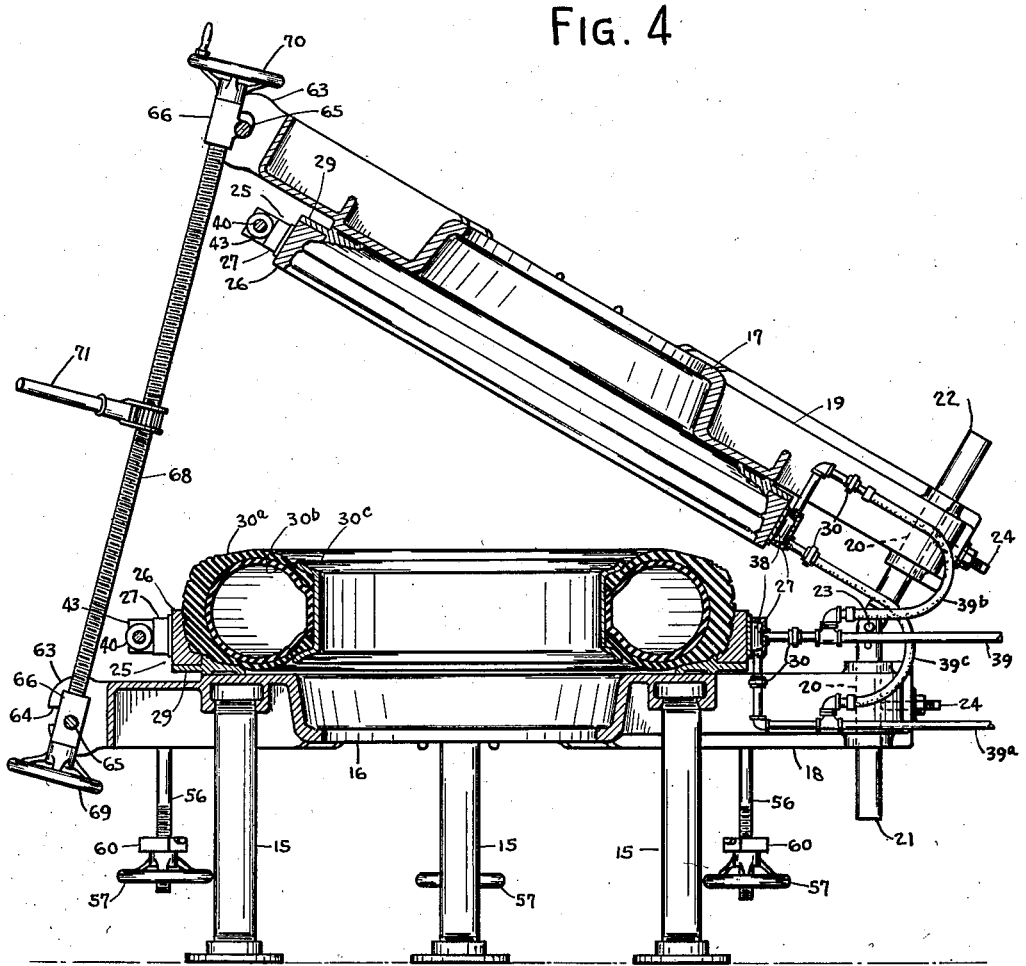
Figure 4 is a cross-section of the apparatus taken substantially on line 4—4 of Figure 1, but shown in the fully open position thereof.

Referring to Figures 1 to 6 of the drawings, the numerals 15, 15 designate suitable supports for a fixed lower platen 16, and the numeral 17 designates an upper platen which is relatively shiftable to and from spaced cooperating relation therewith. Pairs of arms 18, 18 and 19, 19 extending rearwardly from the platens 16 and 17, respectively, have openings 20 therein for adjustably receiving rods 21 and 22 which are pivotally connected to each other at 23 intermediate the arms 18 and 19. Suitable set-screws 24, 24 may be threaded into the ends of arms 19, 20 to engage rods 21 and 22 adjustably to fix the same in openings 20, this arrangement being such that the position of pivot point 23 may be quickly changed to accommodate various sizes and types of matrices and heating rings, as will subsequently be described.

As best shown in Figures 1, 2, 5 and 6, the numerals 25, 25, designate units each of which comprises a matrix 26, having a suitable tread design therein, and a removable vulcanizing unit comprising a heating-ring 27 clamped thereon, these units 25 being removably and replaceably mounted on and supported by the respective platens 16 and 17. It has been found that the separate heating-ring and matrix utilized in the heating and tread-forming units 25 permits of independent placement and removal of matrices and heating-rings which provides a highly flexible equipment.

A pair of separate annular side-wall rings 29, 29, having suitable side-wall designs on the inner faces thereof, may be removably and replaceably retained against the inner sides of the platens by having radially outwardly extending flanges 31, 31 thereon, engaged between the matrices 26, 26 and annular ribs 32, 32 and 33, 33 on said inner sides of the platens. Annular ribs 34, 34 are provided on rings 29, for abutment with the annular ribs 32, positively to center the rings 29 on the platens. Cooperating shoulder portions 35, 35 may be provided on rings 29 for abutment with radially inward faces of the matrices to center the matrices relative to said rings 29.

As best illustrated in Figures 2, 3, and 5, each heating-ring 27 may comprise an annular band portion 36, radially split substantially as shown at 37ª in Figure 3, for embracing the outer periphery of a matrix 26, and an annular channel element 37, welded thereto to provide a chamber 38 therein suitably closed at the ends adjacent the split 37ª. A fluid heating medium, from a suitable source of supply (not shown) is circulated through chamber 38, 38, by means of inlet and outlet pipes 39 and 39a, respectively, communicating with heating-ring 27 of the unit 25 on lower platen 16, and by flexible piping 39b, 39c from pipes 39 and 39a, respectively, similarly communicating with the heating-ring 27 of unit 25 carried by upper platen 17. The heated rings 27 heat the matrices 26 and side-rings 29 by conduction. Suitable quick-acting connectors or unions 30, 30 may be provided in piping 39, 39a, 39b and 39c, and arranged close to the heating-rings 27, for rapidly disconnecting said piping from the respective heating-rings, as for the purpose of removing or replacing units 25.

The inherent resiliency of the material of the split heating-rings 27 causes them to be expansible and contractible so that by suitable means connecting the adjacent ends of the rings they may quickly be adjusted to be clamped in heat-conducting relation to the matrices 26. To this end clamping adjustment of the heating-rings 27 may be obtained by means of eye-bolts 40, 40 pivoted in lugs 41, 41 on one end of the rings, the free end of the bolts 40 being engageable in open grooves 42, 42 in lugs 43, 43 on the respective oppositely disposed ends of the rings, and there being pairs of nuts 44, 44 threaded on each bolt 40 adapted to be turned against opposite sides of the lugs for adjusting the diameter of the heating rings (see Figure 3). The bolts 40 may be swung on their pivots and out of engagement with lugs 43, thereby allowing the heating rings to expand to the fullest extent thereof for removal or replacement of a matrix 26.

As best shown in Figures 1, 2, and 5, the units 25, 25 preferably are adjustably supported in the respective platens 16 and 17 by providing the heating-rings 27 with a plurality of radially outwardly extending pins 46, 46 for engaging through eyelets 48 of radially shiftable and axially adjustable bolts 49, 49 which extend axially inwardly through slots 50, 50 in lugs 51, 51 projecting radially outwardly from the respective upper and lower platens 16 and 17. The bolts 49 may be adjustably retained against axially inward movement by having nuts 52, 52 threaded on the free ends thereof for engagement against plates or washers 53, 53 through which the bolts 49 pass, the plates 53 being slidably retained against the outer faces of the lugs 51. By means of this arrangement the various separate elements of the units 25 may be readily centered in position on the respective platens 16 and 17, with side-wall rings 29 held in position against the inner sides of the platens by the matrices 26, as shown in Figures 5 and 6. Cotter pins 46a may be provided in the ends of the pins 46 to retain the eye-bolts 49 thereon while the same are being adjusted. As will be understood by reference to Figure 5, the nuts 52 are normally effective to be turned on the eye-bolts 49 to urge the units 25, 25 toward the respective platens. The bolts 49, however, are free to shift axially outwardly of the platens as limited by the matrices being backed by the platens, whereby the heating rings 27, 27 are supported by the respective matrices free of clamping pressure thereon when the platens are clamped together. Since the positions of eyelets 48 of bolts 49 are both axially and radially shiftable, units 25 comprising heating-rings and matrices of different sizes may quickly and easily be installed in position on the platens, either by being assembled as placed in the vulcanizer, the matrices having the heating-rings clamped thereon in situ or by being previously assembled and placed as units.

Extending radially outwardly from each of the platens 16 and 17 at the front of the vulcanizer, may be oppositely disposed pairs of spaced lugs 63, 63 having inwardly extending slots 64, 64 for receiving pins 65, 65 extending from a pair of internally threaded blocks 66, 66. Hooked members 67, 67 pivoted on the lugs 63 preferably are positioned removably to engage about the projecting ends of pins 65 to retain the same in slots 64. Threaded through the blocks 66 may be a relatively long screw shaft 68 having hand-wheels 69, 70 fixed on the ends thereof for turning the shaft in the blocks to swing upper platen 17 on hinge points 23, shaft 68 having opposite hand threads running from the middle thereof to opposite ends. Intermediate the ends of the shaft 68 may be a suitable ratchet lever 71 for turning the shaft 68 when relatively great power is required, as for example, for separating the upper and lower matrices after a vulcanizing cycle, or for initially urging the matrices together preparatory to moving rods 56 into the clamping positions thereof against the lugs 59 on upper platen 17.

Referring to Figures 1, 2, and 6, the lower platen 16 may have thereon a plurality of radially outwardly extending lugs 54, 54 on which are pivoted at 55, 55 rods 56, 56 having threaded on the free ends thereof suitable hand-wheels 57, 57. In the closed position of the vulcanizer, as shown in Figure 6, rods 56 may be swung upwardly to engage in slots 58, 58 in the ends of lugs 59, 59 which extend radially outwardly of upper platen 17. The hand-wheels 57 are arranged to be turned against collars 60, 60, extending across the top of slots 58, to lock the vulcanizer in the closed position thereof, against the internal pressure of a pressure-bag 30b within a tire 30a which has been placed in the vulcanizer, the tire with the pressure-bag 30b therein being assembled on a rim 30c. While the vulcanizer is thus locked in the closed position thereof for a vulcanizing operation, the registering matrices, together with side-rings 29, are backed and supported by the platens 16 and 17, and the clamping pressure is applied to the matrices 26 but not to the heating-rings 27.

Figure 7 is similar in all respects to Figure 6 except that the side-wall rings 29, 29 have been omitted to adapt the apparatus for vulcanizing a recapped tire 62a. For this purpose the units 25 are supported on platens 16 and 17 so that the matrices 26, 26 are held directly against the ribs 32, 33 on the platens by adjustment of the nuts 52 of eye-bolts 49 against the plates 53 on lugs 51, as previously described. Suitable tapered annular rings 72, 72 preferably are secured to the inner faces of the platens 16, 17 by means of sunken screws 73, 73 threaded through rings 72 and into the platens for centering the tire 62a relative to the matrices 26, 26. Series of radially spaced tap holes 74, 74 may be arranged at circumferentially spaced points in the platens 16, 17 for receiving screws 73 removably and replaceably to secure centering rings of different diameters and styles thereon.

In Figures 8 and 9 are shown a modified type of removable and replaceable vulcanizing unit 25a, 25a each comprising a separate matrix section 26a and an expansible heating ring 27a removably clamped thereon, units 25a being supported on the inner sides of the platens 16, 17, as before described. Each heating-ring 27a may comprise an annular transversely split, band 75 having a groove 76 on the outer face thereof for receiving a correspondingly split pipe 77 which is secured thereto in any suitable manner, as by welding. The ends of pipe 77 are sealed to provide a chamber within which fluid heating medium may be circulated, through suitable inlet and outlet pipes (not shown). The manner of clamping the split heating-rings 27ª is similar to that described for clamping heating-rings 27, so that like parts have been given like numerals in the drawings.

Another modified form of removable and replaceable vulcanizing unit 25ᵇ, shown in Figures 10 and 11, comprises a separate matrix 26ᶜ having an annular radially split heating-ring 78 removably clamped thereon. Heating-rings 78 preferably are transversely split pipes, similar to the pipes 77, shown in Figures 8 and 9, closed at the ends thereof to provide a chamber for circulation of fluid heating medium from a suitable source (not shown). Clamping means (see Figure 10), similar to that shown in Figures 3 and 8, may be provided for clamping pipes 78 in an annular groove 79 in the matrices 26ᶜ.

It is to be understood that the modified forms of heating-rings 27ª and 78, shown in Figures 9 to 11, may be supported on the respective platens 16, 17 in the manner best shown in Figure 5.

In preparing the vulcanizer for use in a tire retreading operation, the matrices 26 and separate rings 29, if used, and the heating-rings 27 are associated together between the platens, as shown, the heating-rings 27 being secured by means of the bolts 49 so as to be properly supported on the respective platens 16 and 17, with side-rings 29 engaged between the matrices and the platens, so that the matrices 26, 26 will register with each other in the press-closed position of the vulcanizer. The position of hinge-pivot 23 is readily adjustable to suit the various assembled units 25 and side-rings 29 by loosening set-screws 24 to shift the rods 21, 22 in the lugs 18, 19 of the platens. When the units 25 are positioned on the platens, piping 39ª, 39ª and flexible piping 39ᵇ, 39ᵇ may be quickly connected, by means of quick-acting couplings 30, 30, to circulate steam or other heating medium through the heating-rings 27, 27.

A tire 30ª, to which a layer of unvulcanized tread rubber stock 30ᵈ has been applied, is mounted with a pressure-bag 30ᵇ or inner tube therein on a rim 30ᶜ and inserted in the lower half of the vulcanizer while the platens are swung apart. The upper platen 17 is then swung on hinge pivot 23 to bring the matrices 26 and 26 into registering relation, as shown in Figure 6, in which position the platens are clamped together by means of the clamping rods 56. With the tire 30ª thus properly placed in the vulcanizer, pressure is applied to pressure-bag 30ᵇ and the tire is vulcanized at a suitable temperature, maintained by heat supplied to the chambers in heating-rings 27, 27. During vulcanization of tire 30ª the matrices 26 and side rings 29 are backed and supported by the platens 16 and 17 against the internal pressure of the pressure-bag 30ᵇ and there is no clamping pressure on the heating-rings 27.

Thus it will be seen that separate vulcanizing units 25, comprising separate matrices and heating-rings adapted to be removably attached thereto, may be maintained in readiness by the tire repairmen for quickly and easily mounting the same on the upper and lower platens of the vulcanizer as required for the various sizes and types of tires being vulcanized.

Modifications of the invention may be resorted to without departing from the spirit thereof or the scope of the appended claims.

What is claimed is:

1. A vulcanizer for retreading or recapping tires, comprising a pair of relatively movable platens, means for clamping said platens together, separate annular tread matrices mounted between said platens for cooperation with each other, separate heating-rings, means for supporting said rings on said platens, and means for removably securing each of said heating-rings to a tread matrix in heat-conveying relation, said heating rings being so positioned with relation to said platens and said matrices that they are out of contact with each other and with said platens.

2. A vulcanizer for retreading or recapping tires, comprising a pair of relatively movable platens, means for clamping said platens together, separate annular tread matrices mounted between said platens for cooperation with each other, separate heating-rings, means for supporting said rings on said platens, and means for securing each of said heating-rings to a tread matrix, said heating rings being so positioned with relation to said platens and said matrices that they are out of contact with each other and with said platens.

3. A vulcanizer for retreading or recapping tires, comprising a pair of relatively movable platens, means for clamping said platens together, separate annular tread matrices mounted between said platens for cooperation with each other, separate heating-rings, means connected to said platens for removably mounting said heating-rings thereon, and means for securing each of said heating-rings to a tread matrix, said mounting means being relatively shiftable on said platens for securing heating-rings of different sizes on said platens, said heating-rings being so positioned with relation to said platens and said matrices that they are out of contact with each other and with said platens.

4. A vulcanizer for retreading or recapping tires, comprising a pair of relatively movable platens, means for clamping said platens together, separate annular tread matrices mounted between said platens for cooperation with each other, separate heating-rings, means connected to said platens for shiftably mounting said heating-rings thereon, and means for securing each of said heating-rings to a tread matrix, said heating-rings being so positioned with relation to said platens and said matrices that they are out of contact with each other and with said platens.

5. A vulcanizer for retreading or recapping tires, comprising a pair of relatively movable platens, means for clamping said platens together, separate annular tread matrices mounted between said platens for cooperation with each other, separate heating-rings, means connected to said platens for removably mounting said heating-rings thereon, and means for removably securing each of said heating-rings to a tread matrix, said mounting means being axially and radially adjustable relative to said platens for securing heating-rings of different sizes thereto, said heating-rings being so positioned with relation to said platens and said matrices that they are out of contact with each other and with said platens, said mounting means being free to shift axially outwardly of the platens as limited by engagement of the matrices with the respective platens, whereby the heating-rings are supported by the matrices free of the clamping pressure thereon.

6. A vulcanizer for retreading or recapping tires, comprising a pair of relatively movable platens, means for clamping said platens together, separate annular tread matrices mounted between said platens for cooperation with each other, separate transversely split heating-rings, releasable means for clamping each of said heating-rings around the outer periphery of a tread matrix, supporting elements on said heating-rings, and shiftable means on said platens for engaging said elements removably to support said heating rings on the platens, said heating-rings being so positioned with relation to said platens and said matrices that they are out of contact with each other and with said platens.

7. A vulcanizer for retreading or recapping tires, comprising a pair of relatively movable platens, means for clamping said platens together, separate annular tread matrices mounted between said platens for cooperation with each other, separate heating-rings, means for removably mounting said heating rings on said platens, means for removably securing each of said heating-rings to a tread matrix, and separate removable side-wall rings having members thereon engaging between said matrices and said platens to retain said side-wall rings in the vulcanizer, said heating-rings being so positioned with relation to said platens and said matrices that they are out of contact with each other and with said platens.

8. A vulcanizer for retreading or recapping tires, comprising a pair of relatively movable platens, means for clamping said platens together, separate annular tread matrices mounted between said platens for cooperation with each other, separate transversely split heating-rings, adjustable means for removably clamping said heating-rings around the outer periphery of said matrices, supporting elements on said heating-rings, shiftable means on said platens for engaging said elements removably to support heating-rings of different sizes on the platens, and separate removable and replaceable side-wall rings having members thereon for engaging between said matrices and said platens to retain said side-wall rings in the vulcanizer, said heating-rings being so positioned with relation to said platens and said matrices that they are out of contact with each other and with said platens.

9. A vulcanizer for retreading or recapping tires, comprising a pair of relatively movable platens, means for clamping said platens together, separate annular tread matrices mounted between said platens for cooperation with each other, separate heating-rings, and means for securing each of said heating-rings to a tread matrix, said heating-rings having hollow chambers therein for circulation of fluid heating medium therein, said heating-rings being so positioned with relation to said platens and said matrices that they are out of contact with each other and with said platens.

PERRY O. CHAMBERS.